US 8,694,374 B1

(12) United States Patent
Diligenti et al.

(10) Patent No.: US 8,694,374 B1
(45) Date of Patent: Apr. 8, 2014

(54) DETECTING CLICK SPAM

(75) Inventors: Michelangelo Diligenti, Zurich (CH); Diego Federici, Zurich (CH)

(73) Assignee: Google Inc., Mountain View, CA (US)

( * ) Notice: Subject to any disclaimer, the term of this patent is extended or adjusted under 35 U.S.C. 154(b) by 1487 days.

(21) Appl. No.: 11/686,288

(22) Filed: Mar. 14, 2007

(51) Int. Cl.
*G06Q 30/00* (2012.01)

(52) U.S. Cl.
USPC ..................................... 705/14.47

(58) Field of Classification Search
USPC ..................................... 705/14.47
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,920,854 A | 7/1999 | Kirsch et al. | |
| 5,963,940 A | 10/1999 | Liddy et al. | |
| 6,006,222 A | 12/1999 | Culliss | |
| 6,014,665 A | 1/2000 | Culliss | |
| 6,026,388 A | 2/2000 | Liddy et al. | |
| 6,067,565 A | 5/2000 | Horvitz | |
| 6,078,916 A | 6/2000 | Culliss | |
| 6,078,917 A | 6/2000 | Paulsen et al. | |
| 6,088,692 A | 7/2000 | Driscoll | |
| 6,134,532 A | 10/2000 | Lazarus et al. | |
| 6,182,068 B1 | 1/2001 | Culliss | |
| 6,185,559 B1 | 2/2001 | Brin et al. | |
| 6,249,252 B1 | 6/2001 | Dupray | |
| 6,285,999 B1 | 9/2001 | Page | |
| 6,321,228 B1 | 11/2001 | Crandall et al. | |
| 6,327,590 B1 | 12/2001 | Chidlovskii et al. | |
| 6,341,283 B1 | 1/2002 | Yamakawa et al. | |
| 6,363,378 B1 | 3/2002 | Conklin et al. | |
| 6,480,843 B2 | 11/2002 | Li | |
| 6,490,575 B1 | 12/2002 | Berstis | |
| 6,526,440 B1 | 2/2003 | Bharat | |
| 6,529,903 B2 | 3/2003 | Smith et al. | |
| 6,539,377 B1 | 3/2003 | Culliss | |
| 6,560,590 B1 | 5/2003 | Shwe et al. | |
| 6,567,103 B1 | 5/2003 | Chaudhry | |
| 6,587,848 B1 | 7/2003 | Aggarwal et al. | |
| 6,615,209 B1 | 9/2003 | Gomes | |
| 6,623,529 B1 | 9/2003 | Lakritz | |

(Continued)

FOREIGN PATENT DOCUMENTS

| | | |
|---|---|---|
| WO | WO 00/77689 | 12/2000 |
| WO | WO 01/16807 | 3/2001 |
| WO | WO 01/67297 | 9/2001 |
| WO | WO 2004/059514 | 7/2004 |

OTHER PUBLICATIONS

W3C, URIs, URLs and URNs: Classification and Recommendations 1.0, Report from the joint W3C/IETF URI Planning Interest Group, Sep. 21, 2001.*
U.S. Appl. No. 12/331,872, filed Dec. 10, 2008, Le et al.

(Continued)

*Primary Examiner* — John G Weiss
*Assistant Examiner* — Bennett Sigmond
(74) *Attorney, Agent, or Firm* — Fish & Richardson P.C.

(57) ABSTRACT

A computer-implemented method for processing network activities is described. The method includes identifying a model that specifies attributes for network objects, identifying a network object having one or more attributes that deviate from the model, and providing as an input to a ranking algorithm a value associated with the deviance of the one or more attributes of the identified network object.

24 Claims, 7 Drawing Sheets

(56) References Cited

U.S. PATENT DOCUMENTS

| | | | | |
|---|---|---|---|---|
| 6,658,423 | B1 | 12/2003 | Pugh et al. | |
| 6,671,681 | B1 | 12/2003 | Emens et al. | |
| 6,678,681 | B1 | 1/2004 | Brin et al. | |
| 6,701,309 | B1 | 3/2004 | Beeferman et al. | |
| 6,725,259 | B1 | 4/2004 | Bharat | |
| 6,738,764 | B2 | 5/2004 | Mao et al. | |
| 6,754,873 | B1 | 6/2004 | Law et al. | |
| 6,792,416 | B2 | 9/2004 | Soetarman et al. | |
| 6,795,820 | B2 | 9/2004 | Barnett | |
| 6,816,850 | B2 | 11/2004 | Culliss | |
| 6,853,993 | B2 | 2/2005 | Ortega et al. | |
| 6,873,982 | B1 | 3/2005 | Bates et al. | |
| 6,877,002 | B2 | 4/2005 | Prince | |
| 6,882,999 | B2 | 4/2005 | Cohen et al. | |
| 6,901,402 | B1 | 5/2005 | Corston-Oliver et al. | |
| 6,912,505 | B2 | 6/2005 | Linden et al. | |
| 6,944,611 | B2 | 9/2005 | Flank et al. | |
| 6,944,612 | B2 | 9/2005 | Roustant et al. | |
| 6,954,750 | B2 | 10/2005 | Bradford | |
| 6,990,453 | B2 | 1/2006 | Wang et al. | |
| 7,016,939 | B1* | 3/2006 | Rothwell et al. | 709/206 |
| 7,028,027 | B1 | 4/2006 | Zha et al. | |
| 7,072,886 | B2 | 7/2006 | Salmenkaita et al. | |
| 7,085,761 | B2 | 8/2006 | Shibata | |
| 7,113,939 | B2 | 9/2006 | Chou et al. | |
| 7,117,206 | B1 | 10/2006 | Bharat et al. | |
| 7,136,849 | B2 | 11/2006 | Patrick | |
| 7,146,361 | B2 | 12/2006 | Broder et al. | |
| 7,222,127 | B1 | 5/2007 | Bem et al. | |
| 7,231,399 | B1 | 6/2007 | Bem et al. | |
| 7,243,102 | B1 | 7/2007 | Naam et al. | |
| 7,266,765 | B2 | 9/2007 | Golovchinsky et al. | |
| 7,293,016 | B1 | 11/2007 | Shakib et al. | |
| 7,379,951 | B2 | 5/2008 | Chkodrov et al. | |
| 7,382,358 | B2 | 6/2008 | Kushler et al. | |
| 7,395,222 | B1 | 7/2008 | Sotos | |
| 7,426,507 | B1 | 9/2008 | Patterson | |
| 7,451,487 | B2* | 11/2008 | Oliver et al. | 726/24 |
| 7,516,146 | B2 | 4/2009 | Robertson et al. | |
| 7,526,470 | B1 | 4/2009 | Karnawat et al. | |
| 7,533,092 | B2* | 5/2009 | Berkhin et al. | 1/1 |
| 7,533,130 | B2 | 5/2009 | Narayana et al. | |
| 7,552,112 | B2 | 6/2009 | Jhala et al. | |
| 7,565,363 | B2 | 7/2009 | Anwar | |
| 7,565,367 | B2 | 7/2009 | Barrett et al. | |
| 7,566,363 | B2 | 7/2009 | Starling et al. | |
| 7,574,530 | B2 | 8/2009 | Wang et al. | |
| 7,584,181 | B2 | 9/2009 | Zeng et al. | |
| 7,610,282 | B1 | 10/2009 | Datar et al. | |
| 7,657,626 | B1* | 2/2010 | Zwicky | 709/224 |
| 7,680,775 | B2* | 3/2010 | Levin et al. | 707/999.003 |
| 7,693,818 | B2 | 4/2010 | Majumder | |
| 7,716,225 | B1 | 5/2010 | Dean et al. | |
| 7,756,887 | B1 | 7/2010 | Haveliwala | |
| 7,783,632 | B2* | 8/2010 | Richardson et al. | 707/727 |
| 7,801,885 | B1 | 9/2010 | Verma | |
| 7,809,716 | B2 | 10/2010 | Wang et al. | |
| 7,818,320 | B2 | 10/2010 | Makeev | |
| 7,836,058 | B2 | 11/2010 | Chellapilla | |
| 7,844,589 | B2 | 11/2010 | Wang et al. | |
| 7,849,089 | B2 | 12/2010 | Zhang et al. | |
| 7,853,557 | B2 | 12/2010 | Schneider et al. | |
| 7,865,427 | B2* | 1/2011 | Wright et al. | 705/38 |
| 7,877,404 | B2 | 1/2011 | Achan et al. | |
| 7,895,177 | B2 | 2/2011 | Wu | |
| 7,974,974 | B2 | 7/2011 | Tankovich et al. | |
| 7,987,185 | B1 | 7/2011 | Mysen et al. | |
| 8,019,650 | B2 | 9/2011 | Donsbach et al. | |
| 8,024,326 | B2 | 9/2011 | Tong et al. | |
| 8,024,330 | B1 | 9/2011 | Franco et al. | |
| 8,027,439 | B2* | 9/2011 | Zoldi et al. | 379/114.14 |
| 8,037,042 | B2 | 10/2011 | Anderson et al. | |
| 8,037,043 | B2 | 10/2011 | Zoeter et al. | |
| 8,051,061 | B2 | 11/2011 | Niu et al. | |
| 8,060,497 | B1 | 11/2011 | Zatsman et al. | |
| 8,069,182 | B2 | 11/2011 | Pieper | |
| 8,073,263 | B2 | 12/2011 | Hull et al. | |
| 8,073,772 | B2 | 12/2011 | Bishop et al. | |
| 8,086,599 | B1 | 12/2011 | Heymans | |
| 8,090,717 | B1 | 1/2012 | Bharat et al. | |
| 8,156,111 | B2 | 4/2012 | Jones et al. | |
| 8,224,827 | B2 | 7/2012 | Dean et al. | |
| 2001/0000356 | A1 | 4/2001 | Woods | |
| 2002/0034292 | A1 | 3/2002 | Tuoriniemi et al. | |
| 2002/0042791 | A1 | 4/2002 | Smith et al. | |
| 2002/0049752 | A1 | 4/2002 | Bowman et al. | |
| 2002/0103790 | A1 | 8/2002 | Wang et al. | |
| 2002/0123988 | A1 | 9/2002 | Dean et al. | |
| 2002/0133481 | A1 | 9/2002 | Smith et al. | |
| 2002/0165849 | A1 | 11/2002 | Singh et al. | |
| 2003/0009399 | A1 | 1/2003 | Boerner | |
| 2003/0018707 | A1* | 1/2003 | Flocken | 709/203 |
| 2003/0028529 | A1 | 2/2003 | Cheung et al. | |
| 2003/0037074 | A1* | 2/2003 | Dwork et al. | 707/500 |
| 2003/0078914 | A1 | 4/2003 | Witbrock | |
| 2003/0120654 | A1 | 6/2003 | Edlund et al. | |
| 2003/0135490 | A1 | 7/2003 | Barrett et al. | |
| 2003/0135877 | A1 | 7/2003 | Haertel et al. | |
| 2003/0149704 | A1 | 8/2003 | Yayoi et al. | |
| 2003/0167252 | A1 | 9/2003 | Odom et al. | |
| 2003/0204495 | A1 | 10/2003 | Lehnert | |
| 2003/0220913 | A1 | 11/2003 | Doganata et al. | |
| 2003/0229640 | A1 | 12/2003 | Carlson et al. | |
| 2004/0006456 | A1 | 1/2004 | Loofbourrow et al. | |
| 2004/0006740 | A1 | 1/2004 | Krohn et al. | |
| 2004/0034632 | A1 | 2/2004 | Carmel et al. | |
| 2004/0059708 | A1 | 3/2004 | Dean et al. | |
| 2004/0083205 | A1 | 4/2004 | Yeager | |
| 2004/0093325 | A1 | 5/2004 | Banerjee et al. | |
| 2004/0119740 | A1 | 6/2004 | Chang et al. | |
| 2004/0122811 | A1 | 6/2004 | Page | |
| 2004/0153472 | A1 | 8/2004 | Rieffanaugh, Jr. | |
| 2004/0158560 | A1 | 8/2004 | Wen et al. | |
| 2004/0186828 | A1 | 9/2004 | Yadav | |
| 2004/0186996 | A1* | 9/2004 | Gibbs et al. | 713/168 |
| 2004/0199419 | A1 | 10/2004 | Kim et al. | |
| 2004/0215607 | A1 | 10/2004 | Travis, Jr. | |
| 2005/0015366 | A1 | 1/2005 | Carrasco et al. | |
| 2005/0027691 | A1 | 2/2005 | Brin et al. | |
| 2005/0033803 | A1 | 2/2005 | Vleet et al. | |
| 2005/0050014 | A1 | 3/2005 | Gosse et al. | |
| 2005/0055342 | A1 | 3/2005 | Bharat et al. | |
| 2005/0055345 | A1 | 3/2005 | Ripley | |
| 2005/0060290 | A1 | 3/2005 | Herscovici et al. | |
| 2005/0060310 | A1 | 3/2005 | Tong et al. | |
| 2005/0060311 | A1 | 3/2005 | Tong et al. | |
| 2005/0071741 | A1 | 3/2005 | Acharya et al. | |
| 2005/0102282 | A1 | 5/2005 | Linden | |
| 2005/0125376 | A1 | 6/2005 | Curtis et al. | |
| 2005/0160083 | A1 | 7/2005 | Robinson | |
| 2005/0192946 | A1 | 9/2005 | Lu et al. | |
| 2005/0198026 | A1 | 9/2005 | Dehlinger et al. | |
| 2005/0222987 | A1 | 10/2005 | Vadon | |
| 2005/0222998 | A1 | 10/2005 | Driessen et al. | |
| 2005/0240576 | A1 | 10/2005 | Piscitello et al. | |
| 2005/0240580 | A1 | 10/2005 | Zamir et al. | |
| 2005/0256848 | A1 | 11/2005 | Alpert et al. | |
| 2006/0047643 | A1 | 3/2006 | Chaman | |
| 2006/0069667 | A1* | 3/2006 | Manasse et al. | 707/2 |
| 2006/0089926 | A1 | 4/2006 | Knepper et al. | |
| 2006/0095421 | A1 | 5/2006 | Nagai et al. | |
| 2006/0106793 | A1 | 5/2006 | Liang | |
| 2006/0173830 | A1 | 8/2006 | Smyth et al. | |
| 2006/0195443 | A1 | 8/2006 | Franklin et al. | |
| 2006/0200476 | A1 | 9/2006 | Gottumukkala et al. | |
| 2006/0200556 | A1 | 9/2006 | Brave et al. | |
| 2006/0230040 | A1 | 10/2006 | Curtis et al. | |
| 2007/0005575 | A1 | 1/2007 | Dai et al. | |
| 2007/0005588 | A1 | 1/2007 | Zhang et al. | |
| 2007/0038659 | A1 | 2/2007 | Datar et al. | |
| 2007/0061211 | A1* | 3/2007 | Ramer et al. | 705/25 |
| 2007/0081197 | A1 | 4/2007 | Omoigui | |
| 2007/0106659 | A1 | 5/2007 | Lu et al. | |
| 2007/0112730 | A1 | 5/2007 | Gulli et al. | |

(56) References Cited

U.S. PATENT DOCUMENTS

| | | | |
|---|---|---|---|
| 2007/0130370 A1 | 6/2007 | Akaezuwa | |
| 2007/0156677 A1 | 7/2007 | Szabo | |
| 2007/0192190 A1* | 8/2007 | Granville | 705/14 |
| 2007/0214131 A1 | 9/2007 | Cucerzan et al. | |
| 2007/0233653 A1 | 10/2007 | Biggs et al. | |
| 2007/0255689 A1 | 11/2007 | Sun et al. | |
| 2007/0260597 A1 | 11/2007 | Cramer | |
| 2007/0266439 A1 | 11/2007 | Kraft | |
| 2007/0288450 A1 | 12/2007 | Datta et al. | |
| 2008/0010143 A1* | 1/2008 | Kniaz et al. | 705/14 |
| 2008/0027913 A1 | 1/2008 | Chang et al. | |
| 2008/0052219 A1 | 2/2008 | Sandholm et al. | |
| 2008/0052273 A1 | 2/2008 | Pickens | |
| 2008/0059453 A1* | 3/2008 | Laderman | 707/5 |
| 2008/0077570 A1 | 3/2008 | Tang et al. | |
| 2008/0082518 A1 | 4/2008 | Loftesness | |
| 2008/0091650 A1 | 4/2008 | Fontoura et al. | |
| 2008/0114624 A1* | 5/2008 | Kitts | 705/7 |
| 2008/0114729 A1 | 5/2008 | Raman et al. | |
| 2008/0114750 A1 | 5/2008 | Saxena et al. | |
| 2008/0140699 A1 | 6/2008 | Jones et al. | |
| 2008/0162475 A1* | 7/2008 | Meggs et al. | 707/6 |
| 2008/0183660 A1 | 7/2008 | Szulczewski | |
| 2008/0189269 A1 | 8/2008 | Olsen | |
| 2008/0208825 A1 | 8/2008 | Curtis et al. | |
| 2008/0228442 A1 | 9/2008 | Lippincott et al. | |
| 2008/0256050 A1 | 10/2008 | Zhang et al. | |
| 2008/0313168 A1 | 12/2008 | Liu et al. | |
| 2008/0313247 A1 | 12/2008 | Galvin | |
| 2009/0012969 A1 | 1/2009 | Rail et al. | |
| 2009/0055392 A1 | 2/2009 | Gupta et al. | |
| 2009/0157643 A1 | 6/2009 | Gollapudi et al. | |
| 2009/0182723 A1 | 7/2009 | Shnitko et al. | |
| 2009/0287656 A1 | 11/2009 | Bennett | |
| 2010/0106706 A1 | 4/2010 | Rorex et al. | |
| 2010/0131563 A1 | 5/2010 | Yin | |
| 2010/0205541 A1 | 8/2010 | Rapaport et al. | |
| 2010/0228738 A1 | 9/2010 | Mehta et al. | |
| 2010/0241472 A1 | 9/2010 | Hernandez | |
| 2011/0064795 A1 | 3/2011 | Tosi et al. | |
| 2011/0295844 A1 | 12/2011 | Sun et al. | |
| 2012/0191705 A1 | 7/2012 | Tong et al. | |

OTHER PUBLICATIONS

Bar-Llan et al., "Presentation Bias is Significant in Determing User Preference for Search Results—A User X Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10, 19 pages.

Boldi et al.; *The Query flow Graph: Model and Applications*; CKIM '08, Oct. 26-30, Napaya Valley, California, USA, p. 609-617.

Burke, Robin, Integrating Knowledge'based and Collaborative-filtering Recommender Systems, AAAI Technical Report WS-99-01. Compilation copyright © 1999, AAAI (www.aaai.org), pp. 69-72.

Craswell et al.; *Randon Walks on the Click Graph*; Jul. 2007; SIGIR '07, Amsterdam, the Netherlands, 8 pages.

Diligenti et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Hofmann, Thomas, *Latent Semantic Models for Collaborative Filtering*, ACM Transactions on Information Systems, vol. 22, No. 1, Jan. 2004, pp. 89-115.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grëar, Miha, *User Profiling: Collaborative Filtering*, SIKDD 2004, Oct. 12-15, 2004, Ljubljana, Slovenia, 4 pages.

Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.

Joachims et al., "Search Engines that Learn from Implicit Feedback"; Aug. 2007, IEEE Computer Society.

Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.

U.S. Patent Office, U.S. Appl. No. 11/556,143, filed Nov. 2, 2006, in Office Action mailed Jan. 25, 2010, 14 pages.

U.S. Patent Office, U.S. Appl. No. 11/556,143, filed Nov. 2, 2006, in Office Action mailed Jul. 6, 2010, 20 pages.

U.S. Patent Office, U.S. Appl. No. 11/556,143, filed Nov. 2, 2006, in Office Action mailed Apr. 20, 2011, 18 pages.

McDonnell, Philip, A., "Time Based Ranking," U.S. Appl. No. 11/870,893, filed Oct. 11, 2007, 42 pages.

Nicole, Kristen, Heeii is StumbleUpon Plus Google Suggestions, [online], Retrieved from the Internet http://mashable.com/2007/05/15/heeii/, 11 pages.

Lemire, Daniel, *Scale and Translation Invariant Collaborative Filtering Systems*, Published in Information Retrieval, 8(1), pp. 129-150, 2005.

U.S. Patent Office, U.S. Appl. No. 11/685,095, filed Mar. 12, 2007, in Office Action mailed Feb. 8, 2010, 31 pages.

U.S. Patent Office, U.S. Appl. No. 11/685,095, filed Mar. 12, 2007, in Office Action mailed Feb. 25, 2009, 21 pages.

U.S. Patent Office, U.S. Appl. No. 11/685,095, filed Mar. 12, 2007, in Office Action mailed Sep. 10, 2009, 23 pages.

U.S. Patent Office, U.S. Appl. No. 11/685,095, filed Mar. 12, 2007, in Office Action mailed Apr. 13, 2011, 31 pages.

Radlinski, et al., *Query Chains: Learning to Rank from Implicit Feedback*, KDD '05, Aug. 21-24, 2005, Chicago, Illinois, USA, 10 pages.

U.S. Patent Office, U.S. Appl. No. 11/556,086 filed Nov. 2, 2006, in Office Action mailed Jun. 23, 2010, 21 pages.

Schwab et al., *Adaptivity through Unobstrusive Learning*, 2002, 16(3), pp. 5-9.

Stoilova, Lubomira et al., *GiveALink: Mining a Semantic Network of Bookmarks for Web Search and Recommendation*, LinkKDD '05, Aug. 21, 2005, Chicago, IL, USA, 8 pages.

Xiao et al., *Measuring Similarity of Interests for Clustering Web-Users*, ADC, 2001, p. 107-114.

Xie et al., *Web User Clustering from Access Log Using Belief Function*, K-CAP '01, Oct. 22-23, 2001, Victoria, British Columbia, Canada, pp. 202-208.

Yu et al., *Selecting Relevant Instances for Efficient and Accurate Collaborative Filtering*, CIKM '01, Nov. 5-10, 2001, Atlanta, Georgia, pp. 239-246.

Zeng et al., *Similarity Measure and Instance Selection for Collaborative Filtering*, WWW '03, May 20-24, 2003, Budapest, Hungary, pp. 652-658.

U.S. Appl. No. 12/551,052, filed Aug. 31, 2009, Kim et al., Refining Search Results.

U.S. Appl. No. 12/572,739, filed Oct. 2, 2009, McDonnell et al., Recent Interest Based Relevance Scoring.

U.S. Appl. No. 12/506,203, filed Jul. 20, 2009, Tong et al., Generating a Related Set of Documents for an Initial Set of Documents.

U.S. Appl. No. 12/717,064, filed Mar. 3, 2010, Kuramochi et al., Framework for Testing Search Result Hypotheses.

U.S. Appl. No. 12/632,279, filed Dec. 7, 2009, Serboncini et al., Identification and Uses of Search Entity Transition Probabilities.

U.S. Appl. No. 12/756,749, filed Apr. 8, 2010, Lopatenko et al, Ranking Search Results Based on Similar Queries.

U.S. Appl. No. 12/723,973, filed Mar. 15, 2010, Nerurkar, Ranking Search Results Based on Anchors.

U.S. Appl. No. 12/717,475, filed Mar. 4, 2010, Thakur et al., Deriving Site Reputation and Focus from User Feedback Statistics.

U.S. Appl. No. 12/623,276, filed Nov. 20, 2009, Kim et al., Modifying Scoring Data Based on Historical Changes.

U.S. Appl. No. 12/699,549, filed Feb. 3, 2010, Fernandes et al., Evaluating Website Properties by Partitioning User Feedback.

(56) References Cited

OTHER PUBLICATIONS

U.S. Appl. No. 12/718,634, filed Mar. 5, 2010, Kim et al., Temporal-Based Score Adjustments.
U.S. Appl. No. 12/842,345, filed Jul. 23, 2010, Chen et al., Combining User Feedback.
U.S. Appl. No. 12/982,633, filed Dec. 30, 2010, Adams et al., Modifying Ranking Data Based on Document Changes.
Zeng, et al., "Learning to Cluster Web Search Results", SIGIR '04, Proceedings of the 27th Annual International ACM SIGIR conference on research and development in information retrieval, 2004.
U.S. Appl. No. 11/870,893, filed Oct. 11, 2007, McDonnell, Time Based Ranking.
U.S. Appl. No. 12/632,279, filed Dec. 7, 2009, Serboncini et al., Dentification and Uses of Search Entity Transition Probabilities.
U.S. Appl. No. 12/723,973, Mar. 15, 2010, Nerurkar, Ranking Search Results Based on Anchors.
U.S. Appl. No. 12/717,475, filed Mar. 4, 2010, Thakur, et al., Deriving Site Reputation and Focus From User Feedback Statistics.
U.S. Appl. No. 13/476,875, filed May 21, 2012, Lopatenko et al, Ranking Search Results Based on Similar Queries.
U.S. Appl. No. 13/310,901, filed Dec. 5, 2011, Kim et al., Refining Search Results.
U.S. Appl. No. 13/608,278, filed Sep. 10, 2012, Kuramochi et al., Collecting Image Search Event Information.
U.S. Appl. No. 13/618,111, filed Sep. 14, 2012, Kim et al., Modifying Scoring Data Based on Historical Changes.
U.S. Appl. No. 13/620,528, filed Sep. 14, 2012, Kim et al., Refining Search Results.
Agichtein, Eugene et al., "Improving Web Search Ranking by Incorporating User Behavior Information", *SIGIR'06*, Aug. 6-11, 2006, Seattle, WA, pp. 19-26.
Agichtein, Eugene et al., "Learning User Interaction Models for Predicting Web Search Result Preferences", *Proceedings of the 29th Annual International ACM SIGIR Conference on Research and Development in Information Retrieval*, Seattle Washington, (2006), pp. 3-10.
Boyan, Justin et al., "A Machine Learning Architecture for Optimizing Web Search Engines", School of Computer Science, Carnegie Mellon University, May 10, 1996, to appear in AAAI Workshop in Internet-Based Information Systems, Oregon, 1996, pp. 1-8.
Cutrell, Edward et al., "Eye tracking MSN Search: Investigating snippet length, target position and task types", Jan. 2007, pp. 1-13.
Joachims, Thorsten, "Optimizing Search Engines using Clickthrough Data", *Proceedings of the Eighth ACM SIGKDD International Conference on Knowledge Discovery and Data Mining*, Edmonton, Alberta, Canada (2002), pp. 133-142.
Kelly, Diane et al., "Implicit Feedback for Inferring User Preference: A Bibliography", SCILS, Rutgers University, New Brunswick, NJ 08901, 11 pages.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.
Soumen Chakrabarti, et al. "Enhanced Topic Distillation using Text, Markup tags, and Hyperlinks" ACM, Sep. 9-12, 2001, pp. 208-216.
Gabriel Somlo et al., "Using Web Hepler Agent Profiles in Query Generation", ACM, Jul. 2003, pp. 812-818.
Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, Jul. 1999, pp. 250-269.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
Brin, S. and L. Page, The Anatomy of a Large-Scale Hypertextual Web Search Engine, Computer Science Department, Apr. 1998.
International Search Report and Written Opinion for Application No. PCT/US2004/029615, dated Jan. 19, 2005, 8 pages.
Hungarian Patent Office, International Search Report and Written Opinion for Application No. 200806756-3, dated Nov. 19, 2010 12 pages.
Authorized Officer Athina Nickitas-Etienne, International Preliminary Report and Written Opinion for Application No. PCT/US2004/029615, mailed Mar. 23, 2006.
Indian Office Action in Indian Application No. 686/KOLNP/2006, mailed Jun. 3, 2008, 2 pages.
Danish Search Report and Written Opinion for Application No. 200601630-7, dated Jun. 21, 2007, 15 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based on User Goals and Context", User Modeling and User-Adapted Interaction 2, Sep. 1, 1993; pp. 193-220, 28 pages.
Liddy et al., "A Natural Language Text Retrieval System With Relevance Feedback", 16th National Online, May 2-6, 1995, 3 pages.

\* cited by examiner

| Discount Zone | Weighting Factor for Contribution of Network Activity & Ranking Algorithm |
|---|---|
| Zone 1 | Coefficient = 0.5 + A, where A is a Variable Dependant upon an IP Address Position within the Zone 1  5032 |
| Zone 2 | Coefficient = 0.3 + B, where A is a Variable Dependant upon an IP Address Position within the Zone 2  5034 |
| Zone 3 | Coefficient = ∅  5036 |

DETECTING CLICK SPAM

TECHNICAL FIELD

This instant specification relates to detecting anomalous network activity.

BACKGROUND

Internet search engines aim to identify documents or other items that are relevant to a user's needs and to present the document or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance, generally associated with the GOOGLE® PageRank technology, is premised on the assumption that, if authors of web pages felt that another web site was relevant enough to be linked to, then web searches would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

In general, implementations of systems and methods for identifying and processing anomalous network activity are described.

In a first general aspect, a computer-implemented method for processing network activities is described. The method includes identifying a model that specifies attributes for network objects, identifying a network object having one or more attributes that deviate from the model, and providing as an input to a ranking algorithm a value associated with the deviance of the one or more attributes of the identified network object.

In a second general aspect, a computer-implemented method is described, where the method includes generating a model of network navigation for a network object based on aggregated network navigational activities associated with a plurality of network objects. The method also includes identifying a network navigation activity if the network navigation activity deviates from one or more parameter thresholds indicated by the model, and providing as an input to a ranking algorithm a value associated with the deviance of the network navigation activity.

In another general aspect, a system for processing network activities is described. The system includes means for identifying a network object having one or more attributes that are aberrant relative to a model that specifies expected attributes for network objects, and means for providing as an input to a ranking algorithm a value associated with the aberrant one or more attributes.

Implementations of systems and techniques described here may provide one or more of the following advantages. First, some implementations can improve the ranking of search results based on network behavior, such as hyperlink selections, by filtering out anomalous network behaviors. Second, certain implementations make it difficult to spam a significant portion of click data used to modify the ranking of search results by implementing techniques that require significant time and resource investments to circumvent. Third, some implementations can increase the detection of click spam by generating several independent layers of spam filtering criteria. Fourth, certain implementations can dynamically update models used to detect deviant network activity.

The details of one or more implementations of systems and methods for identifying and processing anomalous network activity are set forth in the accompanying drawings and the description below. Other features and advantages of the systems and methods for identifying and processing anomalous network activity will be apparent from the description and drawings, and from the claims.

DESCRIPTION OF DRAWINGS

Like reference symbols in the various drawings indicate like elements.

DETAILED DESCRIPTION OF ILLUSTRIOUS IMPLEMENTATIONS

Certain implementations of systems and techniques for detecting and processing anomalous network activity are described. For example, individual hyperlink selections can be compared to a general population of hyperlink selections to determine if the individual hyperlink selections appear to be "click spam" (i.e., invalid hyperlink selections). In certain implementations, eliminating or decreasing the influence of anomalous network activity, such as click spam, can be important if the network activity is used to improve a correlation between search queries and search results.

In certain implementations, click spam filtering includes multiple layers of independent safeguards, which can include: removing clicks, or selections, associated with new or invalid cookies; limiting a number of clicks based on a particular search query that a single cookie or internet protocol (IP) address can submit during a time period (e.g., one hour, one day, etc.); extracting statistics for individual cookies or IP addresses and filtering out clicks from the cookies or IP address that have anomalous behaviors or attributes; limiting a number of "votes" that a cookie or IP address can contribute to a given query/result pair for algorithms that infer relevance of documents based on the votes; and computing click statistics on a query basis to determine if the clicks appear plausible.

In the following description, identifiers associated with users, such as cookies, IP addresses, MAC addresses, hardware configurations, etc., will be used interchangeably with the term "user". Cookies, as described here, can include unique and/or anonymous identifiers assigned by a server to a user. An issuer for a cookie can prescribe that a cookie have a particular format. For example, a cookie can have predetermined numbers and types of fields. Additionally, a cookie can include a digital signature generated, for example, using a non-invertible hashing function. The signature may decrease the ability of users to forge cookies. Cookies can also include time stamps that specify when certain events associated with the cookie occurred. For example, a timestamp can specify when a cookie was issued to a user. The time since issuance of the cookie can be referred to as the age of the cookie.

Additionally, it will be understood that if a cookie is described as submitting a search query, it is intended that a user (whether human or machine) associated with the cookie is submitting the search query. Similarly, the term webpage and uniform resource identifier (URI) will be used interchangeably. For example, if a user selects a webpage, it will be understood that the user is selecting a URI that identifies the webpage.

Figure 1:
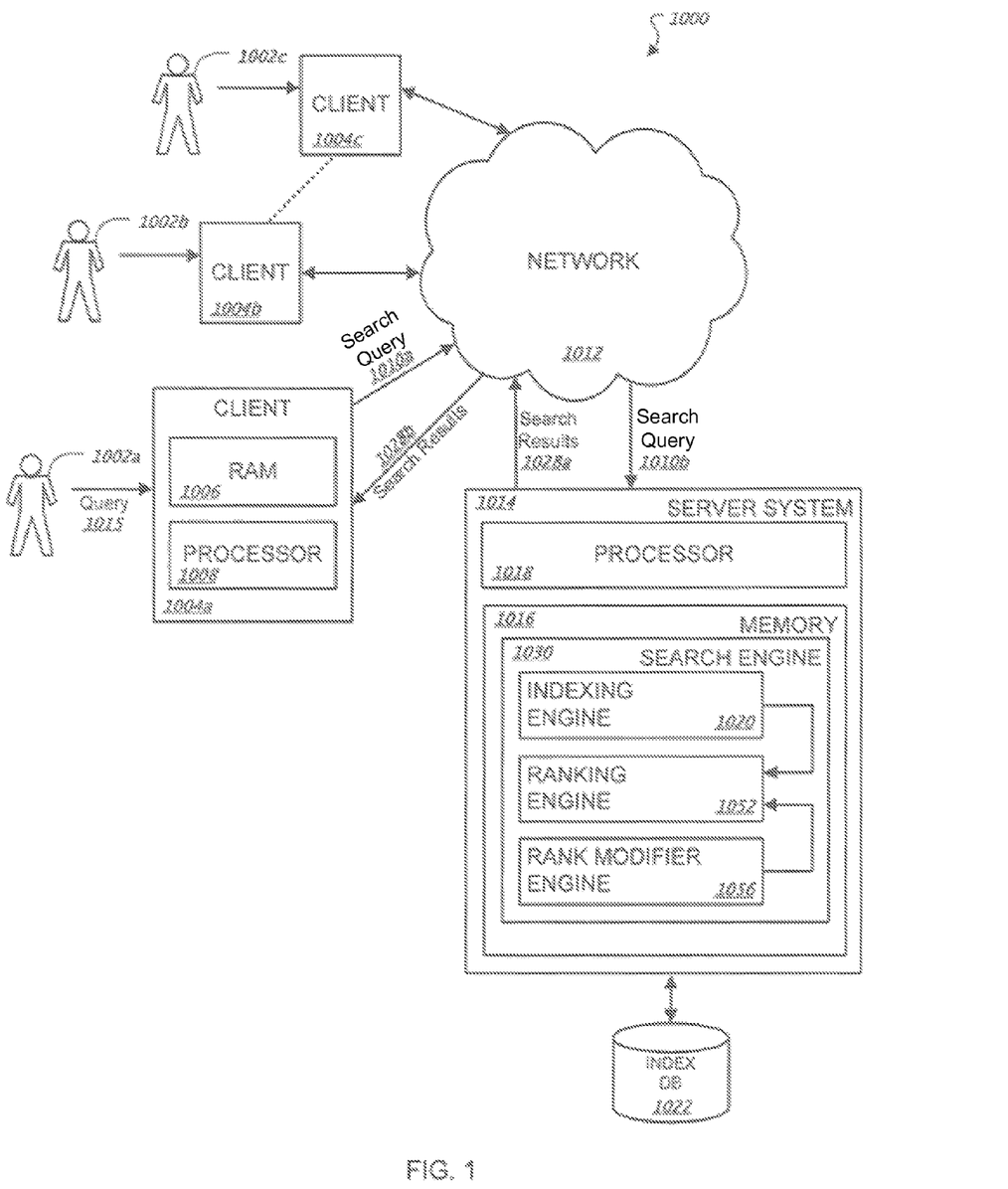
FIG. 1 shows an exemplary system for improving the relevance of search results obtained from submitting search queries.

FIG. 1 shows an example system 1000 for improving the relevance of results obtained from submitting search queries as can be implemented, for example, in an internet, intranet, or other client/server environment. The system 1000 is an example of an information retrieval system in which the systems, components and techniques described below can be implemented. Although several components are illustrated, there may be fewer or more components in the system 1000. Moreover, the components can be distributed on one or more computing devices connected by one or more networks or other suitable communication mediums.

A user 1002 (1002a, 1002b, 1002c) can interact with the system 1000 through a client device 1004 (1004a, 1004b, 1004c) or other device. For example, the client device 1004 can be a computer terminal within a local area network (LAN) or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002a can connect to the search engine 1030 within a server system 1014 to submit a query 1015. When the user 1002a submits the query 1015 through an input device attached to a client device 1004a, a client-side search query 1010a is sent into a network 1012 and is forwarded to the server system 1014 as a server-side search query 1010b. Server system 1014 can be one or more server devices in one or more locations. A server device 1014 includes a memory device 1016, which can include the search engine 1030 loaded therein. A processor 1018 is structured to process instructions within the device 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a user interface of the client device 1004 (e.g., a search results web page displayed in a web browser).

The server-side search query 1010b is received by the search engine 1030. The search engine 1030 uses the information within the user query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in the GOOGLE® PageRank system, which treats a link from one web page to another as an indication of quality for the latter page, so that the page with the most such quality indicators wins.

To further improve such traditional document ranking techniques, the ranking engine 1052 can receive an additional signal from a rank modifier engine 1056 to assist in determining an appropriate ranking for the documents. The rank modifier engine 1056 can perform one or more of operations to generate one or more measures of relevance. Based on a document's relevance, the rank modifier engine 1056 can increase or decrease the ranking of the document in search results For example, a timer can track how long a user views or "dwells" on the document, and the dwell time can be use to infer document relevance. The amount of time is referred to as "click data." For example, a longer time spent dwelling on a document, termed a "long click," can indicate that a user found the document to be relevant for their query. A brief period viewing a document, termed a "short click", can be interpreted as a lack of document relevance. In various implementations, the click data is a count of each click type (e.g., long, medium, short) for a particular query and document combination. Aggregated click data from model queries for a given document can be used to create a quality of result statistic for that document and can be used to enhance a ranking of that document. By way of illustration, a quality of result statistic can be a weighted average of the count of long clicks for a given document and query.

The search engine 1030 can forward the final, ranked result list within a server-side search results signal 1028a through the network 1012. Exiting the network 1012, a client-side search results signal 1028b can be received by the client device 1004a where the results can be stored within the RAM 1006 and/or used by the processor 1008 to display the results on a output device for the user 1002a.

Figure 2:
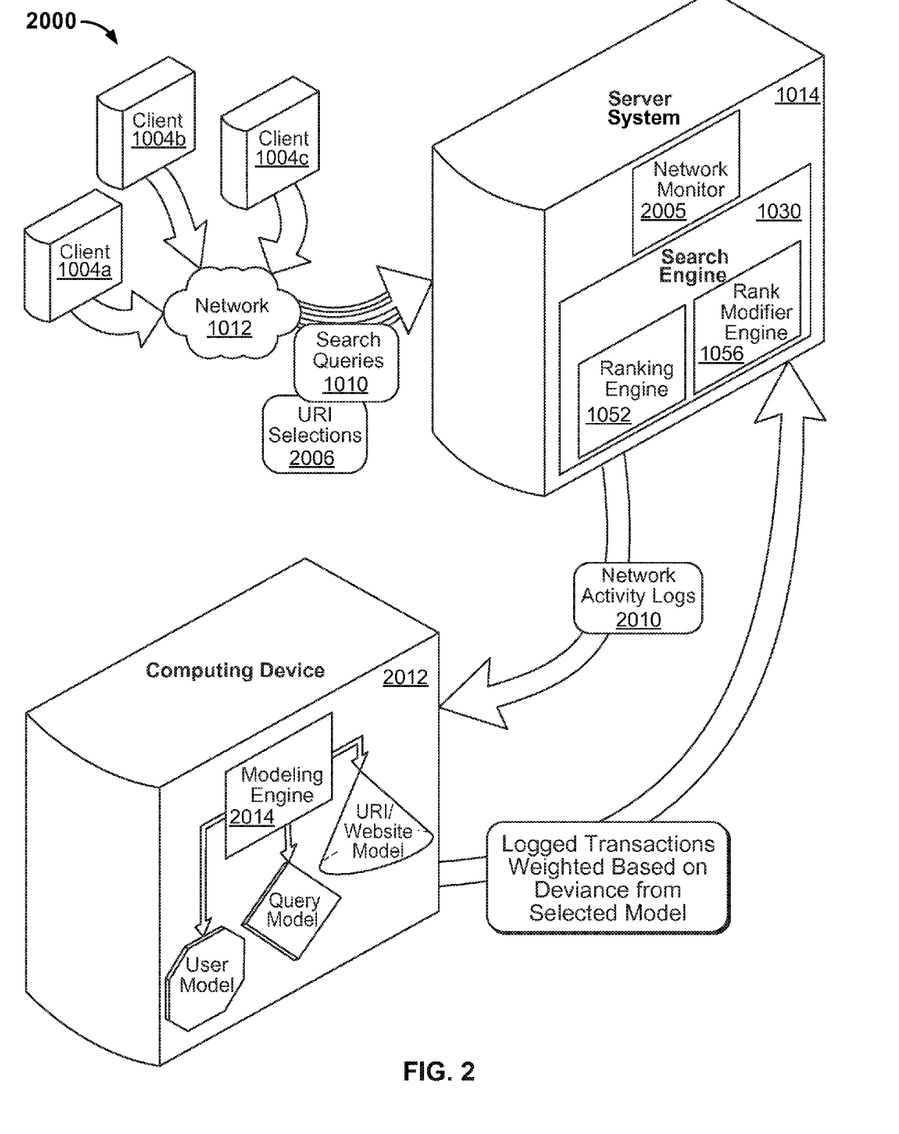
FIG. 2 is an exemplary system for generating models used to detect anomalous network activity and for modifying a contribution of anomalous network activity to ranking search results.

FIG. 2 is an exemplary system 2000 for generating models used to detect anomalous network activity and for modifying a contribution of anomalous network activity to ranking search results. The exemplary system 2000 includes several clients 1004A-C that transmit search queries 1010 and URI (uniform resource identifier) selections 2006, or hyperlink selections, of results from the search queries. In certain implementations, the clients 1004A-C transmit the search queries 2006 and the URI selections 2006 to a server system 1014 over a network 1012, such as the Internet.

The exemplary server 2008 can include a search engine 1030, which, in turn, can include a ranking engine 1052 and a rank modifier engine 2013. The server system 1014 can receive the search queries 1010 and use the search engine 1030 to process them. As discussed above, a ranking engine, such as the ranking engine 1052, can rank the relevance of results associated with a search query and position the results in an order which highlights the more relevant results. The server system 1014 can transmit the results (not shown in FIG. 2) associated with the search queries 1010 back to the clients 1004A-C, and the clients 1004A-C can select results (e.g., displayed as URI links), which can then be transmitted to the server system 1014 as the URI selections 2006.

In certain implementations, the exemplary server system 1014 can include a network monitor 2005 that monitors network activity, such as the search queries 2008, the URI selections 2006, and identifiers for network objects submitting this information. For example, the server system 1014 can record the internet protocol (IP) addresses associated with users that submitted a particular query or selected, or clicked on, a particular search result. The server system 1014 can record the network activity and network objects associated with that activity in network activity logs 2010.

Additionally, the network activity logs 2010 can include or be used to derive statistics associated with the network activity for individual network objects. For example, statistics collected based on each user identifier (e.g., cookie, IP address, MAC address, hardware configuration, etc.) can include, but are not limited to: a number of issued queries; a number of distinct queries; a most input query; a maximum number of times the same query was input; a total number of selections (e.g., clicks, highlighting text, etc.) on URI's; a maximum number of selections on the same search result; a most selected URI; a number of selections of online advertisements; and a number of selections for distinct online advertisements.

Additional statistics compiled for each user can include: a number of long clicks (e.g., a period of time beginning when a user selects a search result from a search web page and ending when a user returns to the search web page, where a user can set a range that defines a "long" period); a number of medium clicks (e.g., a click length shorter than a long click); a number of short clicks (e.g., a click length shorter than a medium click); a Boolean value indicating whether the identifier is associated with a web browser toolbar; a median click position (e.g., a median position on a web page of selected URI's); a portion of search results select that are ranked after a predetermined number (e.g., search results ranked less relevant than the tenth search result); a number of image searches; a number of distinct IP addresses from which a particular cookie was active (e.g., when collecting statistics for a cookie identifier); a number of cookie identifiers that were active from a given IP address (e.g., when collecting statistics for an IP address); a number of distinct clicked search results; and a time delay between a search and a selection of a search result (e.g., this attribute can be used as a single value, such as an average, median, etc., or as a distribution, such as a distribution of the time delays for the network objects).

In certain implementations, additional statistics for each user can be derived from the previously listed statistics. These additional statistics can include: a click to query ratio; a number of distinct clicked search results per total number of clicks; a number of queries per number of distinct queries; a median click length; a maximum number of clicks per time period (e.g., minute, hour, day, etc.); a distribution of click lengths; a distribution of click positions (e.g., ten percent of selections are the last ranked URI of search results); a fraction of clicks outside a first page of search results; a fraction of clicks on advertisements; and a fraction of image searches.

In certain implementations, statistics are collected based on queries. For example, query-based statistics can be gathered for each query and may include: a number of cookies that submitted the query, a number of IP addresses that issued the query; how many times a click was submitted from a malformed cookie for the query (e.g., a malformed cookie may not conform to the correct cookie format specified by the issuer or it may not have a valid digital signature); how many times a click was submitted from a "bad" cookie for the query (where a cookie can be classified as "bad" if it deviated beyond a threshold when compared to a model of a typical cookie); a distribution of "spam scores" for cookies that clicked based on the query (where a "spam score" indicates a deviance of a network object from a model of the expected behavior or attributes of the network object); and a distribution of a spam score for IP addresses that clicked based on the query.

Additional query-based statistics collected for each query can include: a ratio of a number of clicks relative to a number of times the query was issued; a distribution of clicks by URI; a distribution of clicks by position (e.g., position on a web page or ranking on a web page); a distribution of clicks by cookie; a distribution of clicks by IP address; a distribution of click lengths; a distribution of ages of cookies that clicked on a result for the query; a distribution of ages of the cookies that submitted the query; a fraction of clicks on advertisements relative to all clicks; a fraction of users that issued the query and have a particular web browser toolbar; a distribution of clicks for the query by client device (e.g., web browser or operating systems); a distribution of clicks by language of the user (e.g., which may be explicitly provided by the user or inferred from the user's location or search history); a distribution of user languages that issued the query; a ratio of clicks resulting from the query relative to a global average of clicks from other queries for a particular user; and a distribution of clicks by user location (e.g., country, region, or city), which may be explicitly provided by the user or inferred, for example, from a user's IP address or search history.

Additional statistics that can be derived from the above query-based statistics can include: a ratio of a number of cookies and IP addresses that clicked based on the query; a ratio of a number of cookies and IP addresses that submitted the queries; a ratio of a number of times that the query was issued and a number of cookies that issued it; a ratio of a number of times that the query was issued and a number of IP addresses that issued it; a ratio of a number of times that the query was submitted and a number of clicks that resulted from the query; a proportion of spam cookies (e.g., cookies that have spam scores that exceed a threshold) that issued the query; a proportion of spam IP addresses that issued the query; a distribution of the ages of cookies that clicked on the query; a first user agent distribution of the ages of cookies that clicked on results generated by the query; a second user agent distribution of the browsers that issued the query; and a distance between the first and second user agent distribution. For example, a close distance between the two distributions can indicate that the values are similarly distributed.

The statistics based on queries can be used to identify clicks that should be classified as anomalous. For example, if a particular query deviates from a model describing the expected attributes for a typical query, clicks that result from that query (e.g., selections of search results based on the query) can be classified as deviant, too. This is described in more detail below.

The statistics can be regenerated based on a predetermined time periods, such as every hour, day, week, month, etc. In other implementations, the statistics can be used to create longer-term profiles for each user so that the behavior of the user is recorded over a longer period of time. In this implementation, the user's profile can be supplemented with statistical information instead of regenerated on a recurrent basis.

In certain implementations, the server system 1014 can transmit the network activity logs 2010 to a separate computing device 2012 (e.g., another server) that can use a modeling engine 2014 to construct models of network objects, such as models of IP addresses, cookies, MAC addresses, hardware configurations, search queries, URI's, and web domains. These models can define typical, or expected, attributes and behaviors of the network objects.

The computing device 2012 can use the constructed models to identify network objects that deviate from the models. In some implementations, the models include parameters that correspond to the statistics listed above. The statistics for a given network object (e.g., IP address, cookie, web domain, query, etc.) can be compared to statistics aggregated across all network objects. If a network object has an attribute with a statistic that deviates from the model's corresponding parameter, the attribute can be classified as deviant.

In certain implementations, a network object's deviance, or "spamminess", can be partially defined based on whether one or more of the network object's attributes are deviant. The attributes can include a single value or a distribution of values. For example, if an attribute is a distribution, a statistical fitness of the distribution can be compared to a prototypical distribution expected for the attribute. In some implementations, the prototypical distributions are manually generated and encode human prior knowledge. In other implementations, the prototypical distributions are automatically generated by, for example, averaging the values of the same attribute across all (or a set of similar) network objects. Network objects that have a "spamminess" that exceeds a threshold can be removed from the model.

In some implementations, the presence of a single deviant attribute can be sufficient to discard the network object from the model if the deviance exceeds an expected threshold by a predetermined value.

In other implementations, various classification methods can be used to determine a network object's "spamminess". For example, a supervised classifier can be trained using examples of objects pre-determined to be "spammy". The classifier can then determine whether additional network objects are spammy based on the network objects' features relative to the training examples.

The statistics also permit a measurement of the spamminess level of a particular model by numbering the spammed queries, and in certain implementations, weighting the spammed queries by the amount of traffic they receive.

In certain implementations, statistics that are similar to the query-based statistics can also be computed for each URI or web domain. This can also be used as an indication of the spamminess of a model.

In some implementations, logged network activity for a deviant network object is assigned a contribution (e.g., using a weighting coefficient), that decreases the logged network activity's influence in modifying the ranking of search results. For example, the computing device can transmit the logged network activity and its contribution to the server system 1014 that includes the rank modifier engine 2013. The rank modifier engine 2013 can demote the effect of the network activity on the ranking of search results if the network activity is from a deviant IP address.

Figure 3:
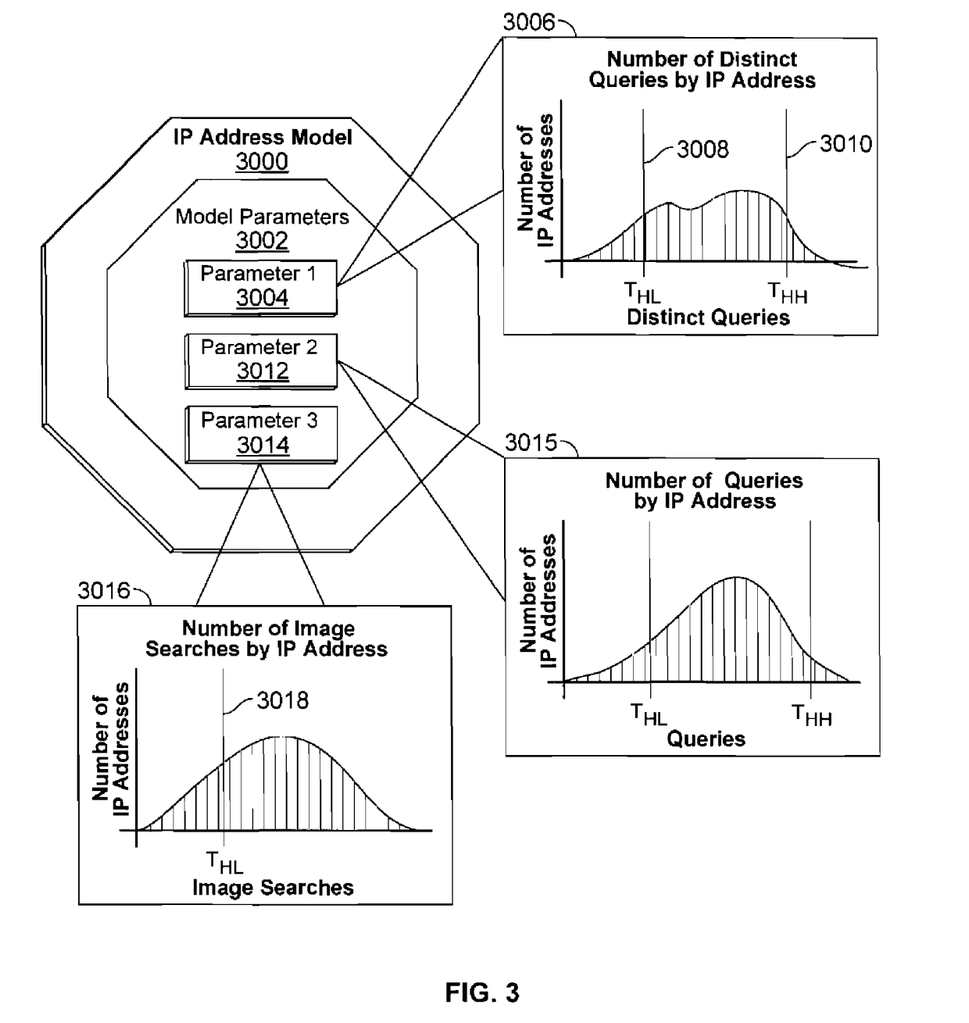
FIG. 3 is a diagram of an exemplary model used to detect anomalous network users.

FIG. 3 is a diagram of an exemplary model 3000 used to detect anomalous network users. The exemplary model 3000 includes typical parameters, such as behaviors or attributes, expected for an IP address. For example, a first parameter 3004 can be based on a distribution of distinct queries issued by IP addresses, which is illustrated by a graph 3006. The Y-axis of the graph 3006 indicates a number of IP addresses, and the X-axis indicates the number of distinct queries. In certain implementations, the information included in the graph 3006 is obtained from the logged network activity and can be updated on a recurrent basis with or independent of updates of other parameters within the model 3000.

The exemplary graph 3006 includes two thresholds—a low threshold ($T_{HL}$) 3008 and a high threshold ($T_{HH}$) 3010. These thresholds can be used to define ranges outside of which a value is considered deviant. For example, if an IP address submits a number distinct of queries that is lower than the $T_{HL}$ 3008, the computing device 2012 can classify the IP address as deviant relative to the other IP addresses in the distribution. Similarly, the computing device 2012 can classify IP addresses that submit a number of distinct queries that is higher than the $T_{HH}$ 3010 as deviant.

A second parameter 3012 and a third parameter 3014 can include similar distributions of data. For example, the second parameter 3012 is illustrated with graph 3015, which shows a distribution of total queries (not just distinct queries) per IP address. Similar to the graph 3006, the graph 3015 also includes threshold values that can define ranges outside of which a value is classified as deviant.

The exemplary third parameter 3014 includes a distribution of image searches issued per IP address, which is illustrated by a graph 3016. The graph 3016 includes a single low threshold 3018. The presence of a single low threshold can indicate that values that occur below the threshold are deviant, but that values that are above the threshold are not deviant (e.g., there is no high threshold above which a value is classified as deviant).

In other implementations, the parameters can be derived from sources other than the logged network activity. For example, instead of defining thresholds using distributions based on the logged network activity, a user can input threshold values, or a range in which a value for an attribute is considered normal, or non-deviant.

Although, FIG. 3 shows a model that describes an expected behavior associated with an IP address, models for other network objects can be constructed as well. In other implementations, the modeled network objects can include cookies, IP addresses, MAC addresses, hardware configurations, particular URI's, entire web domains, search queries, etc.

Figure 4:
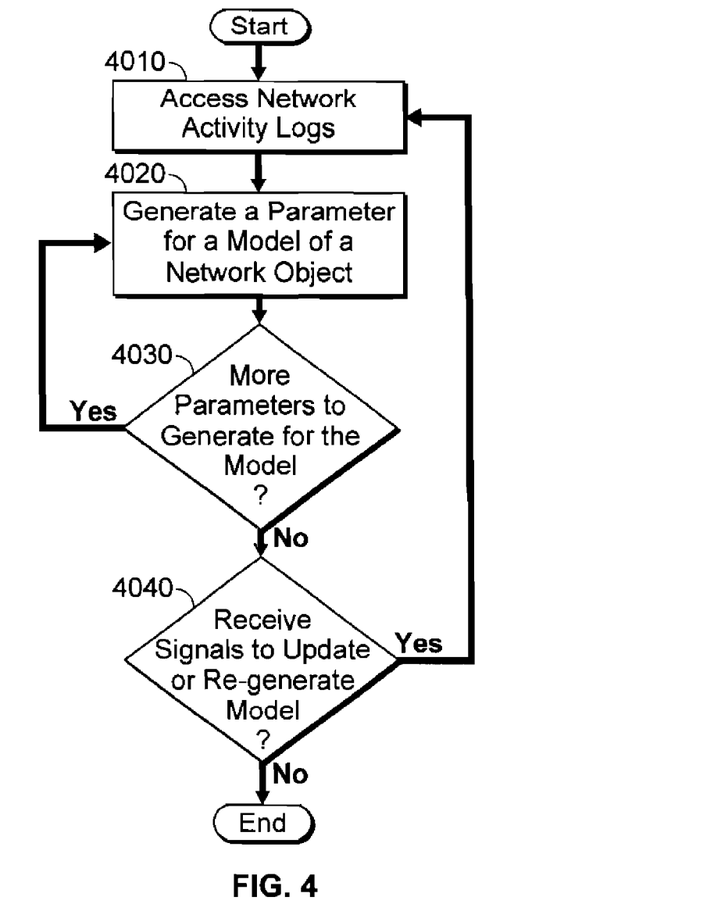
FIG. 4 is a flowchart of an exemplary method for building a model used to detect anomalous network objects.

FIG. 4 is a flowchart of an exemplary method 4000 for building a model used to detect anomalous network objects. The exemplary method 4000 starts with step 4010. In step 4010, network activity logs are accessed. For example, the network activity logs 2010 generated by the network monitor 2005 can be transmitted to the computing device 2012 and accessed by the modeling engine 2014.

In step 4020, a parameter for a network object model can be generated. For example, if the model defines expected behaviors and attributes for an IP address, the modeling engine can generate a parameter that includes an expected number of queries submitted by a typical IP address.

In step 4030, it is determined whether there are more parameters to generate for the model. For example, the modeling engine can determine if additional parameters should be generated for the IP address model. In certain implementations, this determination can be based on user input that includes the number and type of parameters to include in the IP address model. If there are more parameters to generate, the method 4000 returns to step 4020. If not, the method 4000 moves to step 4040.

In the step 4040, a signal is received to update or re-generate the model. For example, the modeling engine can receive a timing signal that prompts it to regenerate the model (or a portion of the model) on a recurrent basis, such as daily, weekly, or monthly. If a signal is received, the method 4000 can return to the step 4010. If a signal is not received, the method 4000 can end.

Figure 5A:
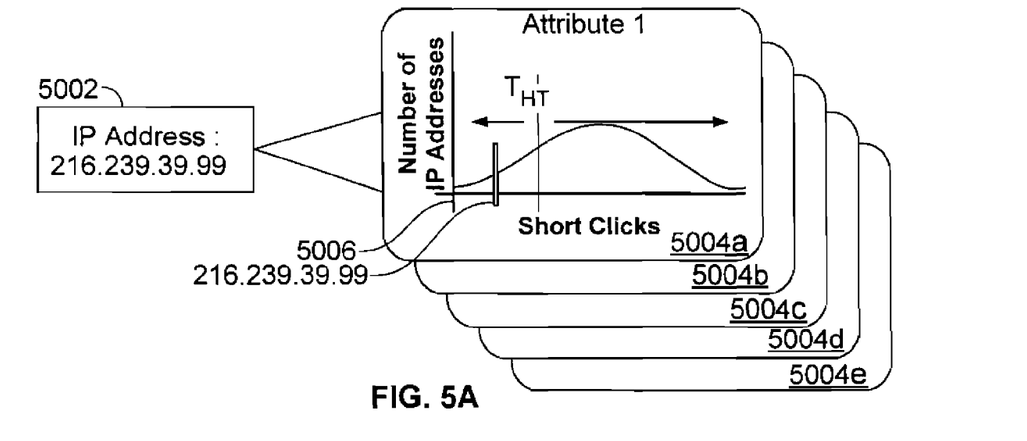
FIGS. 5A-5C are diagrams illustrating aspects of classifying a network object as anomalous.
Figure 5B:
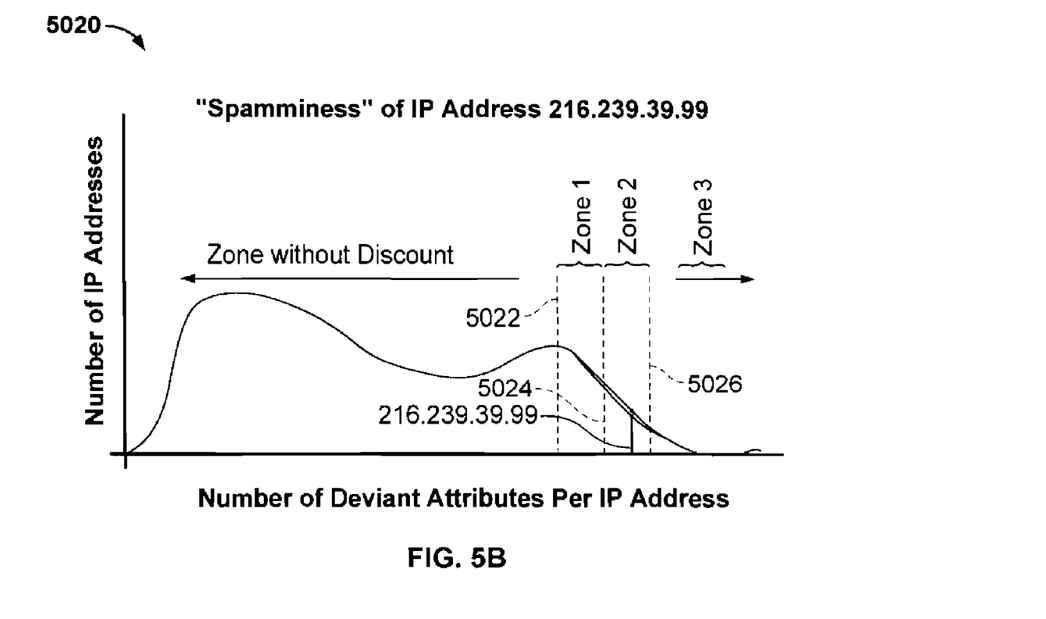
Figure 5C:
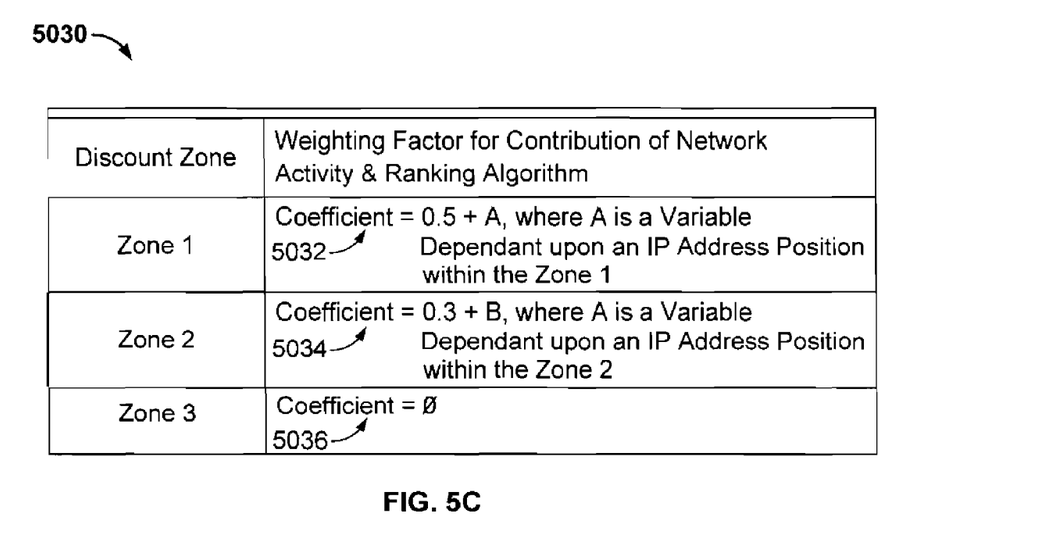

FIGS. 5A-5C are diagrams illustrating aspects of classifying a network object as anomalous. More specifically, FIG. 5A is a diagram that illustrates an IP address 5002 having several attributes 5004A-E and a position of the IP address relative to a distribution of IP addresses that also have the several attributes.

In the illustration of FIG. 5A, IP address 216.239.39.99 has a first attribute 5004A, which includes a number of "short" clicks the IP address has submitted. The number of short clicks for 216.239.39.99 is displayed on a graph 5006 relative to the distribution of short clicks from other IP addresses obtained from, for example, a model of an IP address. The graph 5006 shows that the IP address 216.239.39.99 is included with other IP addresses that have a number of short clicks that is below a low threshold ($T_{HL}$), which indicates the IP address is outside a range considered typical relative to the model. Because the IP address 216.239.39.99 has a number of short clicks below the low threshold, the first attribute 5004A can be classified as deviant.

FIG. 5B shows an exemplary graph 5020 that illustrates a distribution of a network object's deviance relative to other network objects. FIG. 5C shows a table 5030 that illustrates an exemplary correlation between a network object's deviance, or spamminess, and the contribution to a ranking algorithm of navigational activity associated with the network object.

As shown in FIG. 5B, the graph 5020 shows one measure of the spamminess of the IP address 216.239.39.99 relative to other IP addresses. The graph 5020 includes an X-axis that indicates a number of deviant attributes per IP address and a Y-axis that indicates a number of IP addresses. The exemplary graph shows a bi-modal distribution of IP addresses with deviant attributes, where many IP addresses have a either a small number of deviant attributes or a large number of deviant attributes.

The exemplary graph 5020 includes three thresholds, which define four ranges, or zones. IP addresses that include a number of deviant attributes below a first threshold 5022 fall within a zone without a discount (the discounts are described more fully in association with FIG. 5C). IP addresses with a number of deviant attributes between the first threshold 5022 and a second threshold 5024 fall within a first zone. IP addresses with a number of deviant attributes between the second threshold 5024 and a third threshold 5026 fall within a second zone, and IP address with a number of deviant attributes that exceed the third threshold 5026 fall within a third zone.

The table 5030 of FIG. 5C shows exemplary discounts, such as weighting factors, that can be applied to network activity associated with network objects that fall within the zones shown in FIG. 5B. In certain implementations, the discounts can reduce the influence of network activity, such as hyperlink clicks, when computing correlations between search queries and search results. In this way, network activity associated with network objects having a high spamminess can be discarded or discounted when used to refine correlations between search queries and relevant search results.

For example, if an IP address is within the first zone, a first coefficient 5032 can be associated with a value representing the network activity. The exemplary first coefficient 5032 includes a constant of 0.5, which indicates that the rank modifier engine will reduce the network activity's influence by half in a search/result correlation algorithm.

In certain implementations, the coefficient can include additional components that further refine the weight given to the network activity. For example, the coefficient 5032 includes a variable "A" that is dependent upon an IP address' position within the first zone. For example, the closer the IP address is to the second zone, the more variable "A" discounts the network activity.

If an IP address falls within the second zone, the discount may be higher because the probability that the IP address is issuing fraudulent clicks increases. For example, a coefficient 5034 includes a constant 0.3, which approximately reduces the influence of network activity to a third of its full value.

If the IP address falls in the third zone, navigational activity associated with the IP address may be discarded, or discounted entirely. In the example of FIG. 5C, a coefficient 2036 of zero is associated with a value representing the influence of the network activity on a ranking algorithm. The association with the zero coefficient may effectively discard any network activity associated with an IP address in the zone 3 so that it does not influence, for example, a ranking algorithm performed by the rank modifier engine.

In certain implementations, the modeling engine 2014 or another component within the computing device 2012 can assign the discount to the aberrant network activity before transmitting it to the server system 1014. In other implementations, the discount can be assigned by components of the search engine, such as the rank modifier engine 2013. In either implementation, the components can access a table, such as the exemplary table 5030, or other data structure to assign any discounts.

Figure 6:
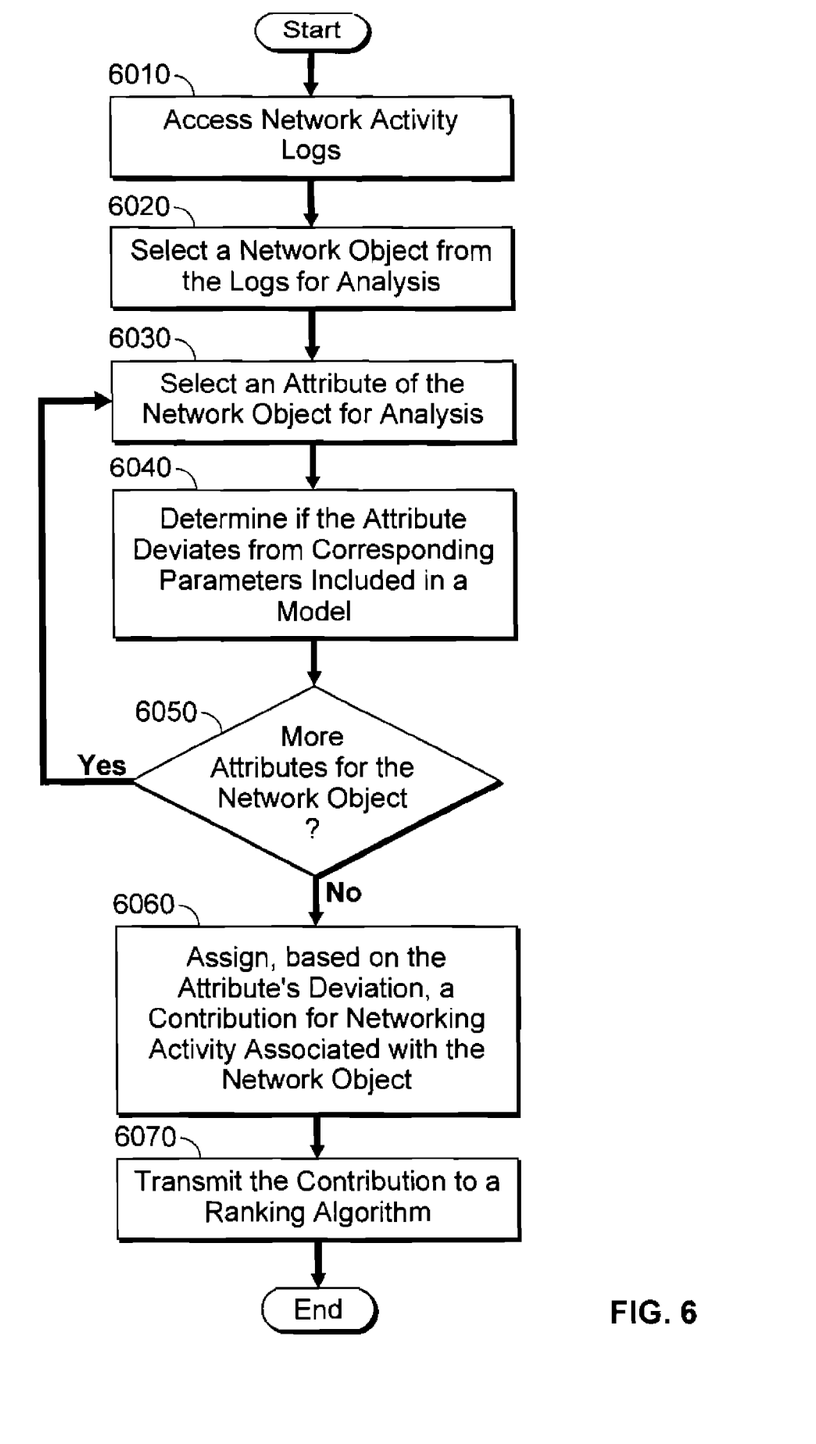
FIG. 6 is a flowchart of an exemplary method for identifying anomalous network objects and assigning a contribution for network activity associated with the anomalous network objects.

FIG. 6 is a flowchart of an exemplary method 6000 for identifying anomalous network objects and assigning a contribution for network activity associated with the network objects. The exemplary method 6000 begins in step 6010 when network activity logs are accessed. For example the modeling engine 2014 can access the network activity logs 2010. In step 6020, a network object is selected from the logs for analysis. For example, an IP address can be selected from the logs.

In step 6030, an attribute of the network object can be selected for analysis. For example, the modeling engine can select the number of clicks that the IP address issues within an hour.

In step 6040, it can be determined whether the attribute deviates from corresponding parameters included in a network object model. For example, the modeling engine can compare the number of clicks submitted by a particular IP address to an expected number of clicks included in a parameter of a model for a typical IP address. If the IP address' attribute deviates beyond a threshold prescribed by the model's parameter, the modeling engine can record this deviation and associate it with the IP address or the IP address' particular attribute.

Next, in step 6050, it can be determined if there are more attributes for the network object. For example, an IP address can have multiple attributes, and the modeling engine 2014 can determine if all the attributes have been examined. If there are more attributes, the method 6000 can return to step 6030. If there are not more attributes for the network object, the method can proceed to step 6060.

In the step 6060, a contribution for networking activity associated with the network object can be assigned based on the attribute's deviation from a model's parameters. For example, a weighting factor of 0.1 can be assigned to network activity associated with a cookie that is classified as highly deviant relative to other cookies.

In step 6070, the contribution can be transmitted to a ranking algorithm. For example, the modeling engine can initiate a transmission of the weighted network activity to the rank modifier engine 2013 for use in modifying the relevance of documents returned in response to search queries. After the step 6070, the method 6000 can end.

Figure 7:
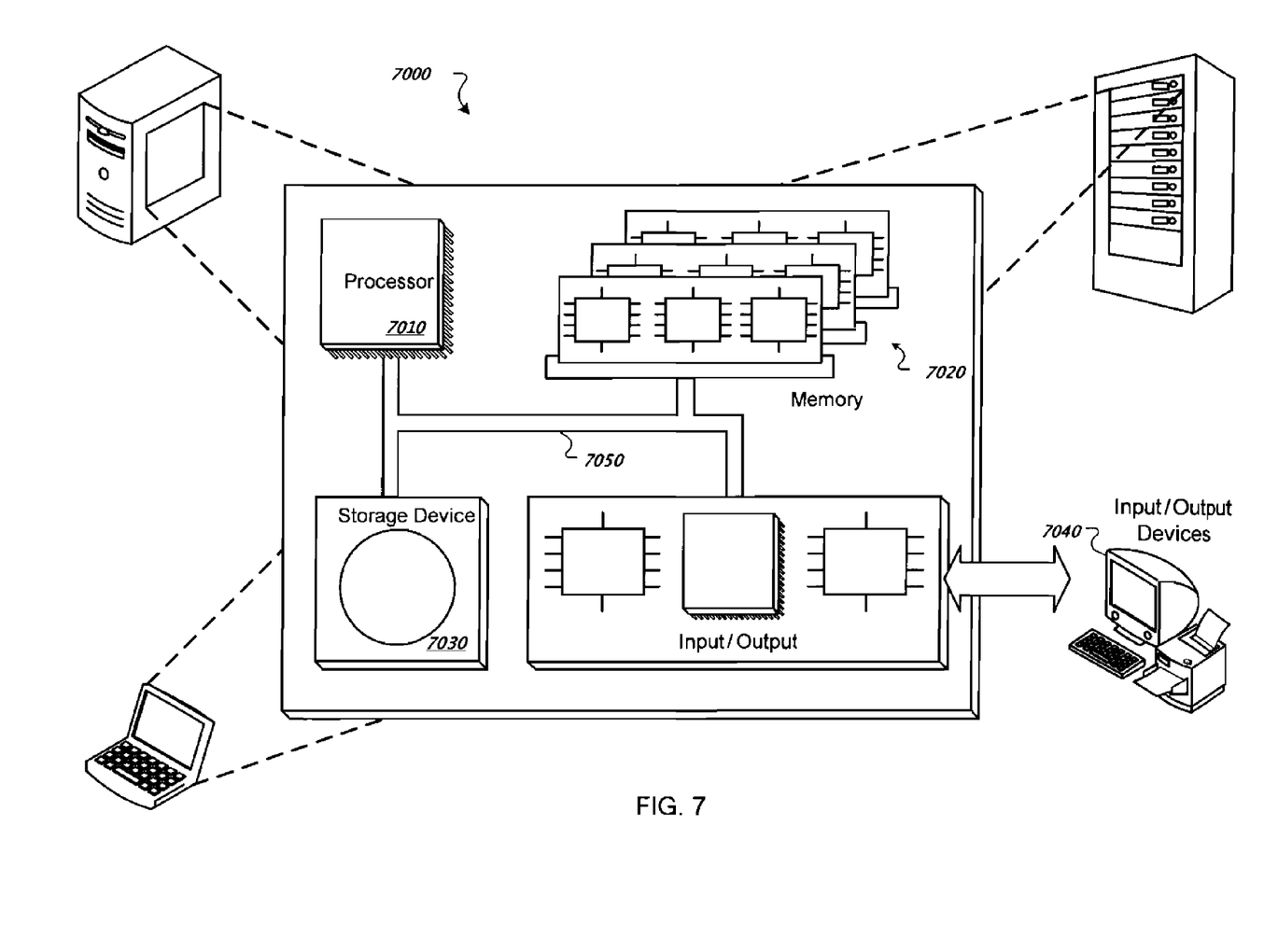
FIG. 7 is a general computing system.

FIG. 7 is a schematic diagram of a computer system 7000. The system 7000 can be used for the operations described in association with any of the computer-implement methods described previously, according to one implementation. The system 7000 includes a processor 7010, a memory 7020, a storage device 7030, and an input/output device 7040. Each of the components 7010, 7020, 7030, and 7040 are interconnected using a system bus 7050. The processor 7010 is capable of processing instructions for execution within the system 7000. In one implementation, the processor 7010 is a single-threaded processor. In another implementation, the processor 7010 is a multi-threaded processor. The processor 7010 is capable of processing instructions stored in the memory 7020 or on the storage device 7030 to display graphical information for a user interface on the input/output device 7040.

The memory 7020 stores information within the system 7000. In one implementation, the memory 7020 is a computer-readable medium. In one implementation, the memory 7020 is a volatile memory unit. In another implementation, the memory 7020 is a non-volatile memory unit.

The storage device 7030 is capable of providing mass storage for the system 7000. In one implementation, the storage device 7030 is a computer-readable medium. In various different implementations, the storage device 7030 may be a floppy disk device, a hard disk device, an optical disk device, or a tape device.

The input/output device 7040 provides input/output operations for the system 7000. In one implementation, the input/output device 7040 includes a keyboard and/or pointing device. In another implementation, the input/output device 7040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, in certain implementations, all network activity associated with a malformed cookie (e.g., a cookie that does not conform to a format prescribed by the issuer) can be discarded from a cookie model or ranking algorithms. Additionally, network activity associated with cookies with an incorrect digital signature can also be discarded.

In other implementations, network activities associated with young cookies (e.g., cookies that were generated or issued in the last seven days) are also discarded from a cookie model or ranking algorithms.

In yet other implementations, components of the described system, such as the modeling engine, can limit the influence that a single network object, such as a cookie, can exert for a particular entry accessed by a ranking algorithm. For example, a user identified by a cookie, IP address, etc., may not be allowed to contribute more than a given number of "votes" per result and query during the same day, where a "vote" includes issuing a search query and selecting a result based on the search query.

Furthermore, in certain implementations, a single user or IP address is not allowed to contribute more than a predefined number of votes per result/query in a ranking algorithm. For example, an IP address may be limited to 10 votes per year. Multiple restrictions can be applied to users and IP addresses. For example, a cookie may be limited to 2 votes a day, 4 votes a week, and 10 votes a year. Any votes that exceed these amounts can be discarded from ranking algorithms.

Furthermore, different user identifiers (e.g., cookies) can be expected to come from different IP addresses on a single entry in a ranking algorithm. If they do not, the network activity associated with the different user identifiers can be discarded.

In yet other implementations, the system and methods can be used to match a random sample of users sessions with corresponding click spam data. Also, in some implementations, queries and documents that have a sudden increase/decreases in clicks can be monitored.

In certain implementations, statistics for the network objects can be grouped by regions, browsers, user types, etc. to create refined models for the network objects that fall within the groups.

In other implementations, system components, such as those illustrated in FIG. 2, can be combined on fewer devices than shown. For example, the modeling engine can be included in the server system 1014, which eliminates the need to transfer the network activity logs 2010 to the computing device 2012.

Additionally, although the clients 1004A-C, the server system 1014, and the computing device 2012 are shown as separate and single devices for illustrative purposes, in certain implementations, each device may include multiple computers. For example, the server system 1014 can include several hundreds or thousands of computers that host the search engine and the network monitor 2005. In some implementations, groups of multiple computers implementing the server system 1014 are geographically separated but connected through a network, such as the Internet.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, the method comprising:
   obtaining a model of typical behavior for each of a plurality of different statistics derived from selection data associated with each of a plurality of user identifiers, the selection data representing prior selections of search results by users associated with respective user identifiers, wherein the search results are responsive to respective search queries;
   determining a distribution of counts of deviations to counts of the user identifiers having those deviations, wherein a particular deviation is a calculated statistic for a user identifier that deviates from typical behavior for the statistic according to the model;
   determining a plurality of zones within the distribution of counts of deviations to counts of the user identifiers having those deviations, wherein each zone defines a respective range of deviations in the distribution;
   determining that a first user identifier of the plurality of user identifiers has a count of deviations that is within a particular zone of the plurality of zones within the distribution; and
   modifying, by one or more computers, selection data associated with the first user identifier based on a weight associated with the particular zone within the distribution in response to determining that the first user identifier has a count of deviations that is within the particular zone within the distribution.

2. The method of claim 1 wherein a user identifier is an Internet Protocol address, a cookie, a media access control address, or a hardware configuration for a client device.

3. The method of claim 1 wherein modifying selection data associated with the first user identifier based on a weight associated with the particular zone within the distribution comprises reducing an influence of one or more attributes of selection data associated with the first user according to the weight when computing statistics between search queries and search results.

4. The method of claim 1, wherein a calculated statistic in the plurality of different statistics is a click to query ratio, a count of click types for different search results, a count of clicked search results per total number of clicks, a count of queries per number of distinct queries, a median click length, a maximum number of clicks per time period, a distribution of the click lengths, a distribution of click positions, a fraction of clicks outside a first page of search results, or a fraction of clicks on advertisements.

5. The method of claim 4 wherein a click type in the click types is a duration of the click.

6. The method of claim 1 wherein the typical behavior for the statistic according to the model is based at least partly on a prototypical distribution for the statistic.

7. The method of claim 6 wherein the prototypical distribution for the statistic is an average of values of the statistic for the plurality of user identifiers.

8. The method of claim 1, wherein modifying selection data associated with the first user identifier based on a weight associated with the particular zone within the distribution comprises:
providing the weight to a ranking process for use in discounting the selection data associated with the first user identifier.

9. The method of claim 1, wherein modifying selection data associated with the first user identifier based on a weight associated with the particular zone within the distribution comprises discounting one or more selection statistics associated with the first user identifier according to the weight.

10. The method of claim 1, further comprising:
calculating the plurality of different statistics; and
building the model of typical behavior for each statistic for the plurality of user identifiers.

11. The method of claim 1, wherein modifying selection data associated with the first user identifier comprises limiting a contribution of selection data associated with the first user identifier.

12. The method of claim 1, further comprising:
providing the modified selection data to a ranking process for ranking search results responsive to search queries.

13. A system comprising:
one or more data processing apparatus; and
a computer-readable storage device having instructions stored thereon that, when executed by the one or more data processing apparatus, cause the one or more data processing apparatus to perform operations comprising:
obtaining a model of typical behavior for each of a plurality of different statistics derived from selection data associated with each of a plurality of user identifiers, the selection data representing prior selections of search results by users associated with respective user identifiers, wherein the search results are responsive to respective search queries;
determining a distribution of counts of deviations to counts of the user identifiers having those deviations, wherein a particular deviation is a calculated statistic for a user identifier that deviates from typical behavior for the statistic according to the model;
determining a plurality of zones within the distribution of counts of deviations to counts of the user identifiers having those deviations, wherein each zone defines a respective range of deviations in the distribution;
determining that a first user identifier of the plurality of user identifiers has a count of deviations that is within a particular zone of the plurality of zones within the distribution; and
modifying selection data associated with the first user identifier based on a weight associated with the particular zone within the distribution in response to determining that the first user identifier has a count of deviations that is within the particular zone within the distribution.

14. The system of claim 13, wherein a user identifier is an Internet Protocol address, a cookie, a media access control address, or a hardware configuration for a client device.

15. The system of claim 13, wherein modifying selection data associated with the first user identifier based on a weight associated with the particular zone within the distribution comprises reducing an influence of one or more attributes of selection data associated with the first user according to the weight when computing statistics between search queries and search results.

16. The system of claim 13, wherein a calculated statistic in the plurality of different statistics is a click to query ratio, a count of click types for different search results, a count of clicked search results per total number of clicks, a count of queries per number of distinct queries, a median click length, a maximum number of clicks per time period, a distribution of the click lengths, a distribution of click positions, a fraction of clicks outside a first page of search results, or a fraction of clicks on advertisements.

17. The system of claim 16, wherein a click type in the click types is a duration of the click.

18. The system of claim 13, wherein the typical behavior for the statistic according to the model is based at least partly on a prototypical distribution for the statistic.

19. The system of claim 18, wherein the prototypical distribution for the statistic is an average of values of the statistic for the plurality of user identifiers.

20. The system of claim 13, wherein modifying selection data associated with the first user identifier based on a weight associated with the particular zone within the distribution comprises:
providing the weight to a ranking process for use in discounting the selection data associated with the first user identifier.

21. The system of claim 13, wherein modifying selection data associated with the first user identifier based on a weight associated with the particular zone within the distribution comprises discounting one or more selection statistics associated with the first user identifier according to the weight.

22. The system of claim 13, wherein the operations further comprise:
calculating the plurality of different statistics; and
building the model of typical behavior for each statistic for the plurality of user identifiers.

23. The system of claim 13, wherein modifying selection data associated with the first user identifier based on a weight associated with the particular zone within the distribution comprises limiting a contribution of selection data associated with the first user identifier.

24. The system of claim 13, wherein the operations further comprise:
providing the modified selection data to a ranking process for ranking search results responsive to search queries.

* * * * *